(12) United States Patent
Watzke

(10) Patent No.: US 6,340,276 B1
(45) Date of Patent: Jan. 22, 2002

(54) THREAD-CUTTING APPARATUS WITH REVERSAL OF DIRECTION OF ROTATION

(75) Inventor: Ruediger Watzke, Neunkirchen (DE)

(73) Assignee: EMUGE-Werk Richard Glimpel Fabrik fuer Praezisionswerkzeuge vormals Moschkau & Glimpel, Lauf (DE)

( * ) Notice: Subject to any disclaimer, the term of this patent is extended or adjusted under 35 U.S.C. 154(b) by 0 days.

(21) Appl. No.: 09/487,114

(22) Filed: Jan. 19, 2000

Related U.S. Application Data

(63) Continuation-in-part of application No. 09/085,088, filed on May 26, 1998, now Pat. No. 6,019,552.

(30) Foreign Application Priority Data

May 28, 1997 (DE) .......................................... 197 22 257
Jan. 26, 1999 (DE) .......................................... 199 02 901

(51) Int. Cl.$^7$ ................................................. B23G 3/02
(52) U.S. Cl. ........................... 408/10; 408/15; 408/139; 470/181; 192/71; 192/84.1; 192/85 R
(58) Field of Search ................................. 408/8, 10–12, 408/14, 15, 139, 140; 470/181–182; 192/84.1, 85 R, 86, 21, 47, 51, 32

(56) References Cited

U.S. PATENT DOCUMENTS 5,096,343 A * 3/1992 Luu ............................ 408/139
6,019,552 A * 2/2000 Watzke ........................ 408/139

\* cited by examiner

Primary Examiner—Steven C. Bishop
(74) Attorney, Agent, or Firm—Jordan and Hamburg LLP

(57) ABSTRACT

A thread-cutting apparatus with reversal of the direction of rotation with a sun-and-planet gear with an axially displaceable reversing device for reversing the direction of rotation of a drill, held in the grip of a spindle, which can be pulled out preferably against a length equalization spring after a given drilling head depth has been reached, especially reversing chucks with pressure equalization pipelines, which discharge into an equalization chamber, sealed by a movable wall from the outside air, wherein the reversing device is actuated by an external driving element, which can be actuated by a reversing signal generated by an actuator.

16 Claims, 2 Drawing Sheets

THREAD-CUTTING APPARATUS WITH REVERSAL OF DIRECTION OF ROTATION

This is a Continuation-In-Part Application of U.S. Ser. No. 09/085,088 filed May 26, 1998, now U.S. Pat. No. 6,019,552.

BACKGROUND OF THE INVENTION

The invention relates to a thread-cutting apparatus with reversal of the direction of rotation with a sun-and-planet gear with an axially displaceable reversing device for reversing the direction of rotation of a drill, held in the grip of a spindle, which can be pulled out preferably against a length equalization spring after a given drilling depth has been reached, especially reversing chucks with pressure equalization pipelines, which discharge into an equalization chamber, sealed by a movable wall from the outside air.

Previously, the construction of such a thread-cutting apparatus was such that a screw tap brought about the switching motion during the reversal. When the end depth of the thread is reached, the chuck is retracted over the controlled forward feed unit. At the same time, the drill is pulled out and this pulling-out path is the switching path for the transmission. Moreover, this pulling-out path represents a machine path, which is required for the free travel of the drill, but otherwise is unnecessary. This causes an air cutting of about 6 to 10 mm before the workpiece is reached and lengthens the tapping cycle and, with that, reduces the effectiveness of the manufacturing process as a whole.

The attainable accuracy of thread depth is affected owing to the fact that the NC machine switches at the exact depth dimension; however, as a result of the unfavorable position of tooth upon tooth of the sun-and-planet gear, the switching element may not be able to engage immediately. This inaccuracy, moreover, depends on the hardness of the length equalization spring, which connects the reversing device with the driven shaft of the chuck. A spring of greater hardness increases the attainable thread depth accuracy but, on the other hand, is responsible for the fact that, particularly in the case of smaller drills, the therefrom resulting high restoring force leads to increased flank friction at the screw tap and, as a result, to a loss of service life with the danger of damage to the thread.

SUMMARY OF THE INVENTION

It is therefore an object of the invention to devise a thread-cutting apparatus of the initially mentioned type in such a manner that, on the one hand, a high thread depth accuracy is achieved and, on the other, overloading the drill is avoided even in the case of small drill sizes.

To accomplish this objective pursuant to the invention, provisions are made so that the reversing device can be actuated by an external driving element, which can be actuated by a reversing signal, which is generated by an actuator.

Pursuant to the invention, the reversing no longer is initiated by pulling out the drill while moving back the controlled forward feed unit. Instead, it is initiated by a separate driving element, which also does not obtain its energy from the pulling out motion itself and instead is driven pneumatically or electrically, for example. The external driving may preferably be a 2-chamber hydraulic cylinder, which is actuated either by compressed air or by a coolant under pressure. Optionally, the driving element may also be a 1-chamber hydraulic cylinder which, making do with only one triggering line, works against a restoring spring. In a development of the invention, it is also possible to construct the external driving element as an electromagnetically driven actuator.

This relationship of the reversing device as regards the pull-out motion of the drill, not only makes it possible to design the length equalization spring to be very soft so that overloading of the drill with the danger of damaging the drill or the thread itself is avoided, but also, beyond this, makes possible a construction, for which the length equalization spring is omitted completely and a chuck can be used for synchronous thread cutting. The possibility of a softer design of the length equalization spring moreover furthermore also has the additional advantage, that the accuracy of the switching point is increased.

In accordance with a further distinguishing feature of the invention, the reversing signal can be generated either by a cam or the like at the grip or generated directly by the advance control which, together with the signal for the moving back of the forward feed unit, simultaneously can generate the reversing signal for the external driving element of the reversing device.

Further advantages, distinguishing features and details of the invention arise out of the following description of an example, as well as out of the accompanying drawing.

Figure 1:
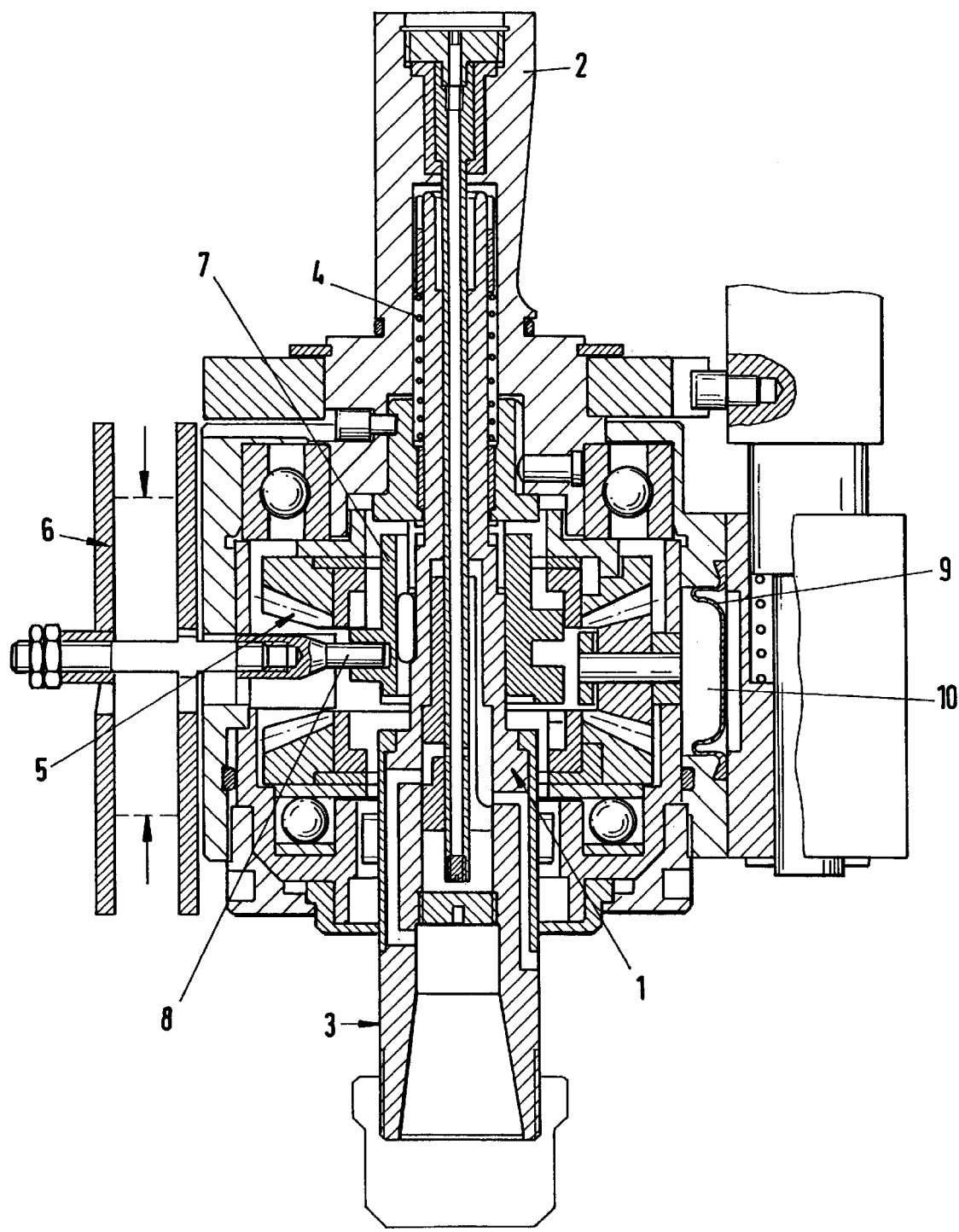
FIG. 1 shows a section through a reversing chuck, which is equipped pursuant to the invention, with a diagrammatically indicated external driving element for the reversing device.
Figure 2:
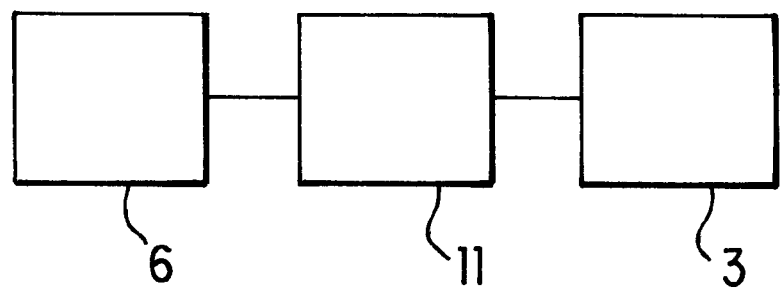
FIG. 2 shows a schematic diagram of a driving element, a cam actuator and a grip of the present invention.
Figure 3:
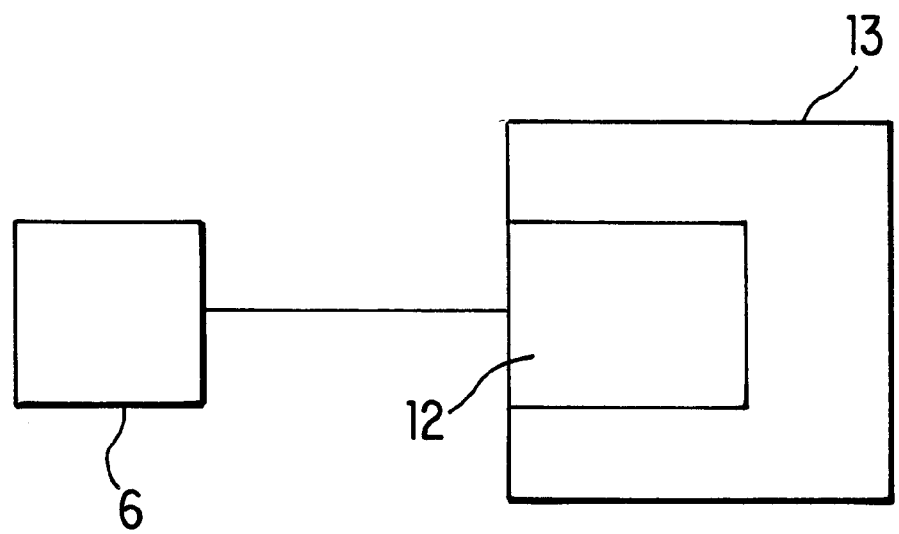
FIG. 3 shows a schematic diagram of an advance control unit and a driving element of a reversing chuck of the present invention.

The accompanying drawing shows a section through a reversing chuck, which is equipped pursuant to the invention, with a diagrammatically indicated external driving element for the reversing device.

DESCRIPTION OF THE PREFERRED EMBODIMENTS

The thread-cutting apparatus, constructed as a reversing chuck, has a spindle 1, which can be pulled out and is in driven connection with the shaft 2 for accommodation in the machine tool. At the front of the spindle, which can be pulled out, the grip 3 for a screw tap, which is not shown, is fastened. When the final depth of the thread is reached, the reversing chuck, which is shown, is moved back over the controlled advance unit of the machine tool, the drill, at the same time, being pulled out against the action of the length equalization spring 4. For pulling out the screw tap—the machine tool continues to rotate steadily further in the same direction of rotation—a reversal of the direction of rotation must be brought about over the sun-and-planet gear 5 and, pursuant to the invention, is accomplished by an external driving element 6. The reversing element 7, which brings about the corresponding switching motion in the sun-and-planet gear 5, is connected over the actuating bolt 8 with the switching element 6. The actuating element 6 can be a single chamber or a 2-chamber hydraulic cylinder or also an electromagnetic switching element. This external driving element 6 is actuated either by a reversing signal, triggered by a cam actuator 11 at the grip, or a reversing signal, which is generated directly in the advance control activator 12 of the machine tool 13 with the reversing signal for retracting the advance unit. Because the reversing element 7 is actuated independently of the pulling-out motion of the drill while reversing, the length equalization spring can be designed to be very soft, so that, even in the case of the smallest drills, the flanks of the screw tap are not overloaded and consequently the drill and/or the thread cut by the drill cannot be damaged. At 9, the closing membrane of a compensating chamber 10 can be recognized, into which pressure-equalization lines discharge and which prevent the occurrence of a reduced pressure, which would interfere with the reversing motion, while the spindle is being pulled out in the course of a retraction of the controlled advance unit. In contrast to the pressure equalization lines, which generally discharge directly into the outside atmosphere, the providing of the equalization chamber 10 with the mobile membrane 9 has the advantage, that the penetration of shavings, liquid or other dirt from the surroundings into the interior of the chuck is prevented.

What I claim is:

1. A thread-cutting apparatus for use with a machine for tapping threads using a tool element, comprising:
   a spindle removably secured and in driven connection with said machine;
   a grip for securing said tool element on said spindle, said spindle being rotated by said machine in an advancing direction to achieve a given advanced depth;
   a sun-and-planet gear with an axially displaceable reversing device for reversing the direction of rotation of said spindle after said given advance depth has been achieved such that said spindle can be withdrawn in a withdrawing direction opposite to said advancing direction; and
   an external driving element actuating said reversing device in response to a reversing signal generated by a cam actuator disposed on said grip.

2. The thread-cutting apparatus of claim 1, further comprising an equalizing spring biasing said spindle in said advancing direction.

3. The thread-cutting apparatus of claim 2, further comprising a driven shaft which drives said spindle, said equalizing spring being disposed about said shaft and between said reversing device and said shaft.

4. A thread-cutting apparatus for use with a machine for tapping threads using a tool element, comprising:
   a spindle removably secured and in driven connection with said machine;
   a grip for securing said tool element on said spindle, said spindle being rotated by said machine in an advancing direction to achieve a given advanced depth;
   a sun-and-planet gear with an axially displaceable reversing device for reversing the direction of rotation of said spindle after said given advance depth has been achieved such that said spindle can be withdrawn in a withdrawing direction opposite to said advancing direction; and
   an external driving element actuating said reversing device in response to a reversing signal generated by an advance control activator disposed within said machine.

5. Thread-cutting apparatus of claim 4, further comprising an equalizing spring biasing said spindle in said advancing direction.

6. The thread-cutting apparatus of claim 5, further comprising a driven shaft which drives said spindle, said equalizing spring being disposed about said shaft and between said reversing device and said shaft.

7. A thread-cutting apparatus for use with a machine for tapping threads using a tool element, comprising:
   a spindle removably secured and in driven connection with said machine;
   a chuck for synchronous thread cutting without retraction of said spindle;
   a grip for securing said tool element on said spindle, said spindle being rotated by said machine in an advancing direction to achieve a given advanced depth;
   a sun-and-planet gear with an axially displaceable reversing device for reversing the direction of rotation of said spindle after said given advance depth has been achieved such that said spindle can be withdrawn in a withdrawing direction opposite to said advancing direction; and
   an external driving element in the form of a single-chamber fluid cylinder utilizing a fluid medium.

8. The thread-cutting apparatus of claim 7, wherein said external driving element is a double-chamber fluid cylinder utilizing a fluid medium.

9. The thread-cutting apparatus of claim 8, wherein said fluid medium is compressed air.

10. The thread-cutting apparatus of claim 8, wherein said fluid medium is a coolant under pressure.

11. A thread-cutting apparatus for use with a machine for tapping threads using a tool element, comprising:
    a spindle removably secured and in driven connection with said machine;
    a grip for securing said tool element on said spindle, said spindle being rotated by said machine in an advancing direction to achieve a given advanced depth;
    a sun-and-planet gear with an axially displaceable reversing device for reversing the direction of rotation of said spindle after said given advance depth has been achieved such that said spindle can be withdrawn in a withdrawing direction opposite to said advancing direction; and
    an external driving element comprising an electromagnet.

12. A thread-cutting apparatus for use with a machine for tapping threads using a tool element comprising:
    a spindle removably secured and in driven connection with said machine;
    a grip for securing said tool element on said spindle, said spindle being rotated by said machine in an advancing direction to achieve a given advanced depth;
    a sun-and-planet gear with an axially displaceable reversing device for reversing the direction of rotation of said spindle after said given advance depth has been achieved such that said spindle can be withdrawn in a withdrawing direction opposite to said advancing direction;
    an external driving element actuating said reversing device in response to a reversing signal generated from an actuator; and
    a compensation chamber, said compensating chamber being sealed by a movable wall from ambient air, and pressure equalizing lines whereby said compensating chamber receives discharges from said pressure-equalizing lines thereby preventing a reduction of pressure within said reversing device during said reversing of direction of said rotation of said tool element.

13. The thread-cutting apparatus of claim 12, wherein said movable wall of said compensating chamber isolates said chamber and said discharges from external contamination.

14. A thread-cutting apparatus for use with a machine for tapping threads using a tool element comprising:

a driven shaft driven by said machine;

a spindle removably secured on said shaft and in driven connection with said machine by said shaft;

a grip for securing said tool element on said spindle, said spindle being rotated by said machine in an advancing direction to achieve a given advanced depth;

a sun-and-planet gear with an axially displaceable reversing device for reversing the direction of rotation of said spindle after said given advance depth has been achieved such that said spindle can be withdrawn in a withdrawing direction opposite to said advancing direction;

an equalizer spring between the reversing device and said shaft for biasing said shaft in said advancing direction;

an external driving element actuating said reversing device in response to a reversing signal generated from an actuator, said spring being in a biasing relationship with said driving element; and a compensation chamber, said compensating chamber being sealed by a movable wall from ambient air, and pressure equalizing lines whereby said compensating chamber receives discharges from said pressure-equalizing lines thereby preventing a reduction of pressure within said reversing device during said reversing of direction of said rotation of said tool element.

15. A thread-cutting apparatus for use with a machine for tapping threads using a tool element, comprising:

a driven shaft driven by said machine;

a spindle removably secured on said shaft and in driven connection with said machine by said shaft;

a grip for securing said tool element on said spindle, said spindle being rotated by said machine in an advancing direction to achieve a given advanced depth;

a sun-and-planet gear with an axially displaceable reversing device for reversing the direction of rotation of said spindle after said given advance depth has been achieved such that said spindle can be withdrawn in a withdrawing direction opposite to said advancing direction;

an external driving element which is moveable to actuate said reversing device in response to a reversing signal generated from an actuator; and an equalizer spring disposed about said shaft and providing a biasing force opposing movement of said external driving element; and a compensation chamber, said compensating chamber being sealed by a movable wall from ambient air, and pressure equalizing lines whereby said compensating chamber receives discharges from said pressure-equalizing lines thereby preventing a reduction of pressure within said reversing device during said reversing of direction of said rotation of said tool element.

16. The thread-cutting apparatus of claim 15 wherein said spring connects said reversing device and said drive shaft.

* * * * *